April 1, 1924.

R. F. CULLEN

AUTOMOBILE BUMPER

Filed May 31, 1923

1,488,633

Richard F. Cullen INVENTOR.

BY

ATTORNEY.

Patented Apr. 1, 1924.

1,488,633

UNITED STATES PATENT OFFICE.

RICHARD FREDRICK CULLEN, OF SAN ANTONIO, TEXAS.

AUTOMOBILE BUMPER.

Application filed May 31, 1923. Serial No. 642,635.

*To all whom it may concern:*

Be it known that I, RICHARD F. CULLEN, a citizen of the United States, residing at San Antonio, in the county of Bexar and State of Texas, have invented certain new and useful Improvements in Automobile Bumpers, of which the following is a specification.

My said invention relates to a bumper for automobiles and it is an object of the same to provide a bumper which shall be strong and rigid while at the same time it is inexpensive and simple in structure.

Figure 1:
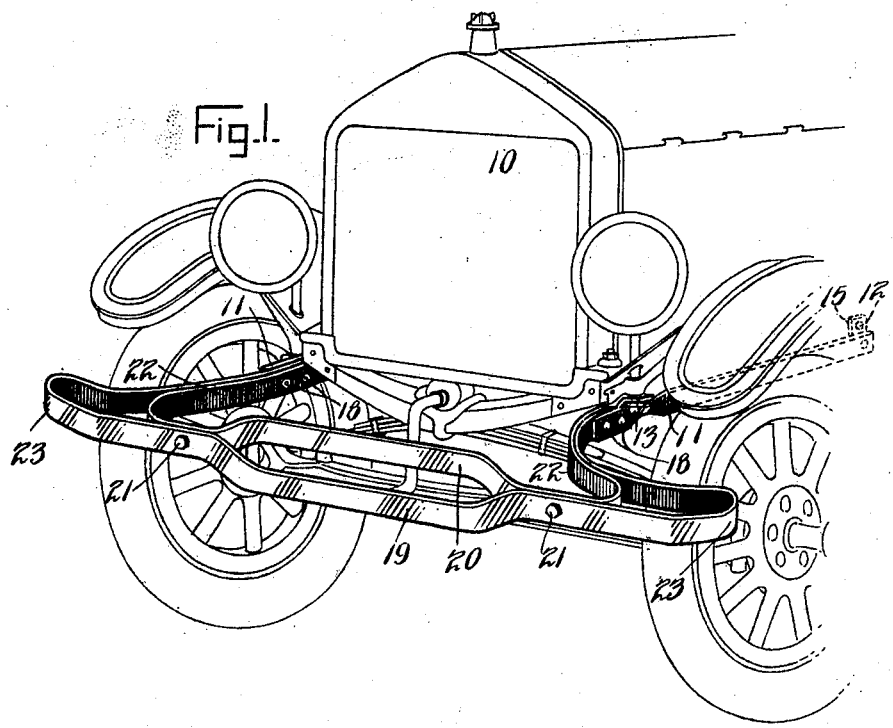
Figure 2:
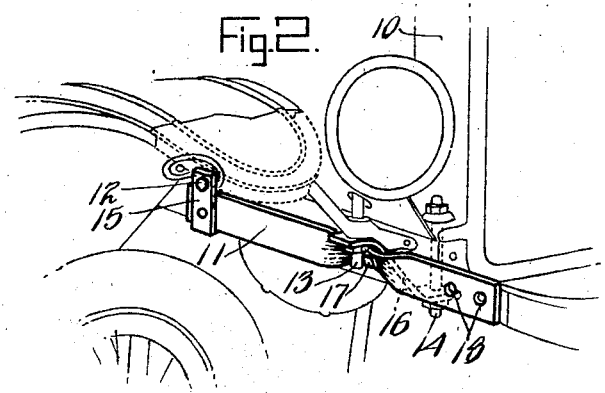

Referring to the accompanying drawings, which are made a part hereof and on which similar reference characters indicate similar parts, Figure 1 is a perspective of a part of an automobile with my bumper applied thereto, and Figure 2, a perspective showing the attaching means for the bumper.

In the drawings reference character 10 indicates the body of an automobile which may be of any desired type though here shown as part of a Ford automobile. Supporting bars 11 are secured to the sides of the machine frame at its lower corners and this may be done by removing the ordinary nuts from the frame bolts at 12, 13, and 14 whereupon a short bar of steel or the like 15 bolted to the bar 11 is placed on the bolt 12 and the nut again positioned thereon. An inclined bar 16 is secured to a twisted section of the bar 11 as by a rivet 17 or by welding and this bar has holes fitting over the bolts 13 and 14 and secured thereto by replacement of the nuts which are held in place by lock-washers. Each bar 11 has at its forward end a pair of bolt-holes 18 to receive bolts for securing the bumper thereto.

The bumper comprises front and rear bars 19 and 20 of spring steel. These bars are secured together by bolts 21 between which the bars are bent to provide vertically spaced parallel portions at the front of the machine. Beyond the bolts 21 the rear bar is bent with a relatively short curve to provide a rearwardly extending portion 22 while the front bar is provided with a much wider curve 23 extending out in front of the wheels and then curving back into face contact with the parts 22, said face contact being maintained to the rear ends of the bars.

It will be evident that the bumper of my invention is unusually strong and reliable in that both the steel bars which constitute the bumper itself run back and connect directly to the car chassis itself, abutting at their ends against the bar 16 so as to relieve the shock and strain otherwise falling entirely on the hangers 11. This also aids to prevent the bolts of the bumper from being damaged in case of a very hard blow. By reason of the curved ends which are bolted together there is no play or side motion in the bumper, the ends are hidden and as no clamps are used there is less danger of parts coming loose or being lost and less noise while at the same time the simplicity of the device and its graceful lines add to the appearance of the car. The curves at the front and side whereby the bumper surface is increased at the sides also add to the appearance of the bumper. Preferably the front side and the top edge are coated with copper and then nickeled from end to end, the remainder of the bumper and its holders being enameled in black.

Having thus fully described my said invention, what I claim as new and desire to secure by Letters Patent, is:

1. An automobile bumper having a pair of spaced bars parallel for a part of their length, then curved laterally into face contact with each other, then bent back in different curves to separate them for a distance, and then again having face contact to their point of attachment to the vehicle, substantially as set forth.

2. In an automobile, a pair of supporting bars fixed to the frame thereof, diagonal bars fast to said supporting bars and said frame, and a bumper bar extending across the car and back in contact with said supporting bars respectively and fixed thereto, and abutting at the rear end against the respective diagonal bars, substantially as set forth.

3. In an automobile, a pair of supporting bars fixed to the side frame, diagonal bars fast to said supporting bars and fastened at the side of and beneath the frame, and a pair of bars extending across the car to provide a bumper, said bumper bars extending back in face to face contact alongside said supporting bars respectively and fixed thereto, and abutting at the rear end against the respective diagonal bars, substantially as set forth.

4. An automobile bumper having a pair of spaced bars parallel for a part of their length, then curved laterally into face contact with each other, then bent back in different curves to separate them for a distance, and means for fixing the ends of the bars to the automobile, substantially as set forth.

In witness whereof, I have hereunto set my hand and seal at San Antonio, Texas, this 25th day of May, A. D. nineteen hundred and twenty-three.

RICHARD FREDRICK CULLEN. [L. S.]

Witnesses:
 RUBY V. MANGHAM,
 J. C. HALL.